(12) United States Patent
Ishida et al.

(10) Patent No.: US 12,057,625 B1
(45) Date of Patent: Aug. 6, 2024

(54) VEHICLE BODY-EMBEDDED ANTENNA DEVICE

(71) Applicant: HARADA INDUSTRY CO., LTD., Tokyo (JP)

(72) Inventors: Jun Ishida, Tokyo (JP); Toshihiro Iwata, Tokyo (JP); Mikio Ueno, Tokyo (JP); Takeshi Sakano, Tokyo (JP)

(73) Assignee: HARADA INDUSTRY CO., LTD., Tokyo (JP)

( * ) Notice: Subject to any disclaimer, the term of this patent is extended or adjusted under 35 U.S.C. 154(b) by 0 days.

(21) Appl. No.: 18/685,837

(22) PCT Filed: Jul. 8, 2022

(86) PCT No.: PCT/JP2022/027168
§ 371 (c)(1),
(2) Date: Feb. 22, 2024

(87) PCT Pub. No.: WO2023/026705
PCT Pub. Date: Mar. 2, 2023

(30) Foreign Application Priority Data

Aug. 25, 2021 (JP) .................................. 2021-137049

(51) Int. Cl.
*H01Q 1/32* (2006.01)
*H01Q 1/22* (2006.01)
(Continued)

(52) U.S. Cl.
CPC ............... *H01Q 1/325* (2013.01); *H01Q 1/22* (2013.01); *H01Q 1/42* (2013.01); *H01Q 9/0407* (2013.01)

(58) Field of Classification Search
CPC .......... H01Q 1/32; H01Q 1/3275; H01Q 1/22; H01Q 1/42; H01Q 9/0407; H01Q 9/42
See application file for complete search history.

(56) References Cited

U.S. PATENT DOCUMENTS 11,165,132 B2 * 11/2021 Greenstein ......... H05K 7/20509
11,456,525 B2 *  9/2022 Katsura ................ H01Q 1/3208
(Continued)

FOREIGN PATENT DOCUMENTS

JP   2014216661 A   11/2014
JP   2016012915 A    1/2016
(Continued)

OTHER PUBLICATIONS

International Search Report in PCT/JP2022/027168, dated Sep. 27, 2022.

*Primary Examiner* — Hasan Islam
(74) *Attorney, Agent, or Firm* — Global IP Counselors, LLP

(57) ABSTRACT

A vehicle body-embedded antenna device basically includes a plate-like antenna element, a circuit board and a fixed conductive part. The plate-like antenna element is disposed inside the bathtub-shaped part at the highest possible level therein so as to be substantially parallel to the metal body surface. The circuit board is disposed inside the bathtub-shaped part so as not to overlap the plate-like antenna element as viewed from above. The circuit board has a feeding part connected with the plate-like antenna element. The fixed conductive part is electrically conductive to both the circuit board and the bathtub-shaped part. The fixed conductive part is fixed to a bottom part of the bathtub-shaped part through an attachment hole formed in the bottom part of the bathtub-shaped part.

8 Claims, 2 Drawing Sheets

(51) Int. Cl.
*H01Q 1/42* (2006.01)
*H01Q 9/04* (2006.01)

(56) References Cited

U.S. PATENT DOCUMENTS

| | | |
|---|---|---|
| 2015/0357705 A1 | 12/2015 | Ito |
| 2016/0079661 A1 | 3/2016 | Ito et al. |
| 2020/0212548 A1 | 7/2020 | Imamura et al. |

FOREIGN PATENT DOCUMENTS

| | | |
|---|---|---|
| JP | 2019071548 A | 5/2019 |
| JP | 2020088569 A | 6/2020 |
| JP | 2020108146 A | 7/2020 |
| JP | 2021104690 A | 7/2021 |

* cited by examiner

VEHICLE BODY-EMBEDDED ANTENNA DEVICE

CROSS-REFERENCE TO RELATED APPLICATIONS

This application is a U.S. national stage application of International Application No. PCT/JP2022/027168, filed on Jul. 8, 2022. This application claims priority to Japanese Patent Application No. 2021-137049, filed on Aug. 25, 2021.

BACKGROUND

Technical Field

The present invention relates to a vehicle body-embedded antenna device, and more particularly to a vehicle body-embedded antenna device embedded in a surface of a metal body such as a vehicle roof.

Background Information

Antenna devices each of which is mounted on a vehicle and supports multiple frequency bands, covering, e.g., AM/FM bands, include various types such as pillar antennas, roof mount antennas, and glass antennas. Unfortunately, the pillar antenna having a large amount of protrusion is more likely to bend due to contact, etc. The roof mount antenna needs to be tilted flat or removed from the vehicle body in a multilevel parking garage or in an automatic car-wash machine due to the high ground height. Further, the glass antenna could increase the development costs due to requirement of specific, model-based development.

Then, recently, there has been a growing trend to put weight on the vehicle design and therefore, it is required that the antenna devices to be mounted on vehicles do not spoil the appearance of the vehicles as much as possible. In order to meet the requirement, various types of antenna devices that are built in a spoiler have been developed (e.g., Japanese Patent Application Kokai Publication No. 2014-216661—Patent Document 1, or Japanese Patent Application Kokai Publication No. 2016-012915—Patent Document 2).

The above spoiler built-in type is good in horizontal polarization characteristics but not good in vertical polarization characteristics. Further, the spoiler built-in type is disposed away from a metal body, thus requiring countermeasures against noise radiated from electric components inside the vehicle.

Under such circumstances, there have also been developed a vehicle body-embedded antenna device which is capable of being embedded in a vehicle body and exhibiting improved horizontal/vertical polarization characteristics (Japanese Patent Application Kokai Publication No. 2019-071548—Patent Document 3). The antenna device disclosed in Patent Document 3 has a grounding type antenna element disposed in a vehicle body opening and uses a grounding bracket with which a circuit board having a feeder part is directly grounded to a vehicle pillar.

SUMMARY

Since the vehicle body-embedded antenna device of Patent Document 3 is disposed in the vehicle body opening, it is necessary to hollow out the vehicle body according to the antenna element. However, some vehicle manufacturers hesitate to hollow out the vehicle body. Further, this may also require countermeasures against noise radiated from electric components inside the vehicle.

Thus, a vehicle body-embedded antenna device that has no need to hollow out the vehicle body and to take countermeasures against noise radiated from electric components inside the vehicle is required to be developed.

The present invention has been made in view of the above situations, and an object thereof is to provide a vehicle body-embedded antenna device capable of being embedded in a recess formed in a vehicle metal body.

To achieve the above object of the present invention, a vehicle body-embedded antenna device according to the present invention includes: a plate-like antenna element having a planar plate part disposed inside the bathtub-shaped part at a highest possible level therein so as to be substantially parallel to the metal body surface: a circuit board disposed inside the bathtub-shaped part so as not to overlap the plate-like antenna element as viewed from above and having a feeding part connected with the plate-like antenna element: and a fixed conductive part electrically conductive to both the circuit board and bathtub-shaped part and fixed to a bottom part of the bathtub-shaped part through an attachment hole formed in the bottom part of the bathtub-shaped part.

The bottom part of the bathtub-shaped part may have two depth levels of a deep part and a shallow part, and the plate-like antenna element may be positioned in the deep part as viewed from above, and the circuit board may be positioned in the shallow part as viewed from above.

The vehicle body-embedded antenna device may further include a signal transmitting/receiving connector which is disposed on the back surface side of the shallow part of the bathtub-shaped part.

The fixed conductive part may include a ground base disposed just below the circuit board and electrically conductive to a ground of the circuit board and a capture fixed to the ground base through the attachment hole formed in the bottom part of the bathtub-shaped part and electrically conductive to the bathtub-shaped part.

The vehicle body-embedded antenna device may further include an on-ground type antenna element disposed on the circuit board.

The on-ground type antenna element may be disposed inside the bathtub-shaped part at the highest possible level therein.

The vehicle body-embedded antenna device may further include a waterproof case, and the circuit board may be covered with the waterproof case.

The vehicle body-embedded antenna device may further include an insulating base part that supports a lower surface of the plate-like antenna element from the bottom part of the bathtub-shaped part.

The vehicle body-embedded antenna device according to the present invention has an advantage of suppressing deterioration in antenna performance even when it is embedded in a recess formed in a vehicle metal body.

BRIEF DESCRIPTION OF THE DRAWINGS

Referring now to the attached drawings which form a part of this original disclosure, an illustrative embodiment is shown.

DETAILED DESCRIPTION OF EMBODIMENTS

Figure 1:
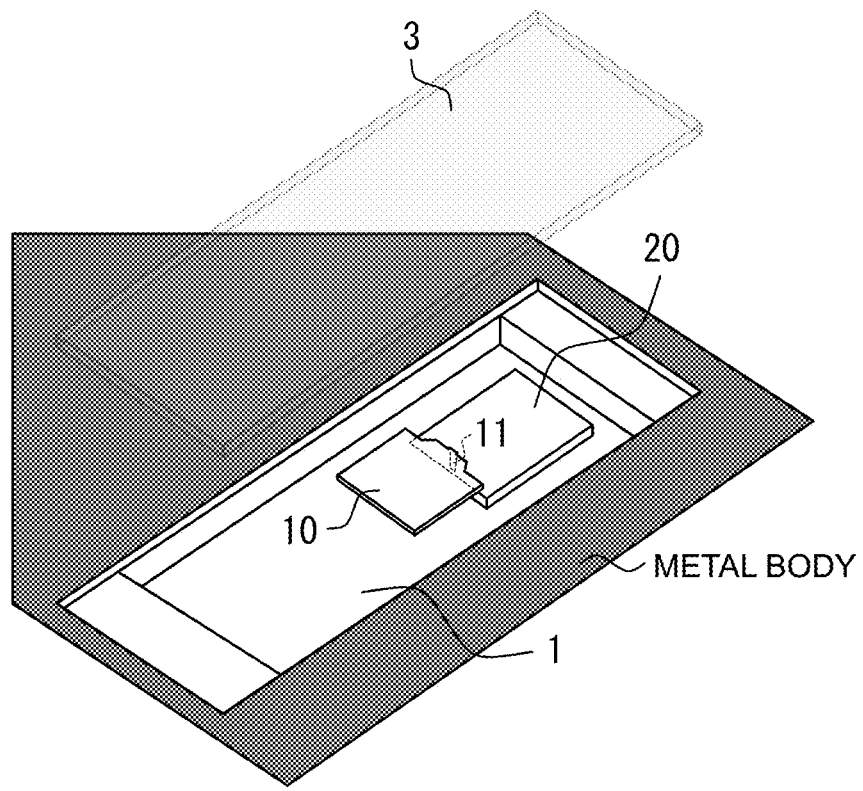
FIG. 1 is a schematic perspective view for explaining a vehicle body-embedded antenna device according to one illustrated embodiment.
Figure 2:
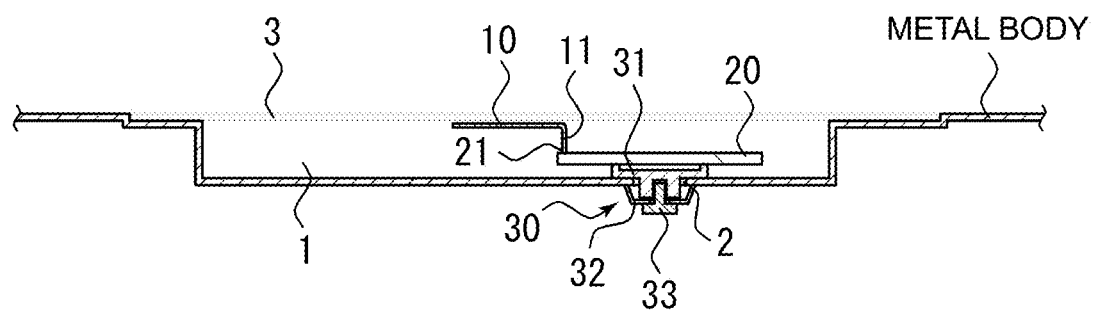
FIG. 2 is a schematic cross-sectional side view for explaining the vehicle body-embedded antenna device according to the illustrated embodiment.

Hereinafter, an embodiment for practicing the present invention will be described with reference to the accompanying drawings. FIG. 1 is a schematic perspective view for explaining a vehicle body-embedded antenna device according to the present invention. FIG. 2 is a schematic cross-sectional side view for explaining the vehicle body-embedded antenna device according to the present invention. In the drawings, the same reference numerals as those in FIG. 1 denote the same parts. The vehicle body-embedded antenna device according to the present invention is embedded in a recess formed by recessing a vehicle metal body with respect to the surface thereof. In the present specification, the recess will be hereinafter referred to as a bathtub-shaped part 1. The vehicle metal body may be, for example, a roof or a hood. Further, the vehicle metal body may include any metal structure that can be recessed, such as a vehicle frame. The bathtub-shaped part 1 is obtained by recessing the vehicle metal body with respect to the metal body surface through a metal press process such as a drawing process. The bathtub-shaped part 1 may have an attachment hole 2 formed in a bottom part thereof. The attachment hole 2 is used to fix the vehicle body-embedded antenna device and to allow a cable for transmitting/receiving signals to pass therethrough. The bathtub-shaped part 1 may be obtained by recessing, for example, a part of the roof into a rectangular shape having a size fitted to the vehicle body-embedded antenna device or may be configured by appropriately using a bead provided in the roof or a roof reinforce.

As illustrated, the vehicle body-embedded antenna device according to the present invention is mainly constituted by a plate-like antenna element 10, a circuit board 20, and a fixed conductive part 30. These constituent elements are embedded in the bathtub-shaped part 1 of the vehicle body and covered with a cover 3 such as a blindfold cover or a glass cover, whereby finally an invisible antenna is constructed.

The plate-like antenna element 10 is disposed inside the bathtub-shaped part 1 at the highest possible level therein so as to be substantially parallel to the metal body surface. To allow the plate-like antenna element 10 to be disposed inside the bathtub-shaped part 1 at the highest possible level therein, the plate-like antenna element 10 is disposed so as to be flush with, for example, a roof surface in an exposed state. When the cover 3 is of a fitting type as illustrated, the height of the plate-like antenna element 10 is lowered from the roof surface by the thickness of the cover 3. The bathtub-shaped part 1 is obtained by processing the metal body and is thus made of a metal plate. Therefore, when the distance between the plate-like antenna element 10 and the bottom part of the bathtub-shaped part 1 is small, a planar plate part of the plate-like antenna element 10 and the bottom part of the bathtub-shaped part 1 are capacitively coupled, deteriorating signal reception performance. To prevent this, in the vehicle body-embedded antenna device according to the present invention, the plate-like antenna element 10 is disposed inside the bathtub-shaped part 1 at the highest possible level therein. As described above, the plate-like antenna element 10 is disposed sufficiently spaced apart from the bottom part of the bathtub-shaped part 1 to such a degree as to obtain sufficient signal reception performance. In other words, the bathtub-shaped part 1 may have such a depth as to allow sufficient signal reception performance to be ensured when the plate-like antenna element 10 is disposed inside the bathtub-shaped part 1 at the highest possible level therein. In the illustrated example, the plate-like antenna element 10 is disposed at substantially the center of the bathtub-shaped part 1 as viewed from above. This is because since the side wall of the bathtub-shaped part 1 is also made of metal, the plate-like antenna element 10 and the side wall needs to be separated to such a degree as to eliminate the influence of capacitive coupling.

The plate-like antenna element 10 may have a planar plate part substantially parallel to, for example, the vehicle roof surface. The plate-like antenna element 10 is a grounding type antenna having a planar shape and may function like, for example, a monopole antenna. For example, the plate-like antenna element 10 has such an antenna capacity that functions as a capacitive antenna that supports the radio AM band or the like. In order for the plate-like antenna element 10 according to the present invention to function as a capacitive antenna, the area thereof may be determined such that the planar plate part has an antenna capacity enough to receive the AM band. The plate-like antenna element 10 may be formed by processing a metal plate, for example. That is, for example, a rectangular planar plate part may be formed by cutting a metal plate. However, the present invention is not limited to this, but for example, the plate-like antenna element 10 may be formed by processing a conductive foil of a printed board or a flexible printed board. Further alternatively, since the planar plate part of the plate-like antenna element 10 may have an antenna capacity enough to function as a capacitive antenna supporting the AM band, it may be a meander shaped element having an antenna capacity substantially equivalent to that of the planar plate part. The plate-like antenna element 10 is provided with a feeder 11. For example, the feeder 11 may be formed into a pin shape by folding the end portion of the planar plate part.

Further, since the planar plate part of the plate-like antenna element 10 may be disposed inside the bathtub-shaped part 1 at the highest possible level therein so as to be substantially parallel to the metal body surface, the plate-like antenna element 10 may have a portion extending downward from the planar plate part, which is formed by folding work, so as to increase element length or antenna capacity. In the illustrated example, the plate-like antenna element 10 is formed as one plate-like antenna element: however, the present invention is not limited to this, but a plurality of plate-like antenna elements for different frequency bands may be provided. Even in this case, the planar plate part of the plate-like antenna elements for different frequency bands may be disposed inside the bathtub-shaped part at the highest possible level therein so as to be substantially parallel to the metal body surface.

The circuit board 20 is disposed inside the bathtub-shaped part 1 so as not to overlap the plate-like antenna element 10 as viewed from above. That is, the plate-like antenna element 10 is disposed so as not to cover over the circuit board 20; however, the vicinity of the feeder 11 may slightly cover over the circuit board 20. The circuit board 20 has a feeding part 21 connected with the plate-like antenna element 10. Specifically, the feeder 11 of the plate-like antenna element 10 is connected to the feeding part 21. The circuit board 20 may be a typical printed board, for example. A coil, an amplifier circuit, and the like are placed on the circuit board 20. Further, the circuit board 20 is electrically connected with a signal cable to be connected to a tuner or the like provided in the vehicle. To make the ground of the circuit board 20 stable, the circuit board 20 is preferably brought close to the metal body. That is, the circuit board 20 is preferably disposed in the vicinity of the bottom part of the bathtub-shaped part 1.

The fixed conductive part 30 is electrically conductive to the circuit board 20 and further to the bathtub-shaped part 1. The fixed conductive part 30 is fixed to the bottom part of the bathtub-shaped part 1 through the attachment hole 2 formed in the bottom part of the bathtub-shaped part 1. Accordingly, the circuit board 20 and the bathtub-shaped part 1 (metal body) serving as the ground of the antenna element are electrically conductive through the fixed conductive part 30. Since the fixed conductive part 30 is fixed to the bottom part of the bathtub-shaped part 1 through the attachment hole 2 as described above, fixing the circuit board 20 to the fixed conductive part 30 results in fixation of the vehicle body-embedded antenna device to the vehicle body. Specifically, the fixed conductive part 30 may be constituted by a ground base 31 and a capture 32. The ground base 31 is disposed just below the circuit board 20 and electrically conductive to the ground of the circuit board 20. The capture 32 is fixed to the ground base 31 through the attachment hole 2 formed in the bottom part of the bathtub-shaped part 1 and electrically conductive to the bathtub-shaped part 1. The capture 32 is fastened and fixed to the ground base 31 using a bolt 33. The ground base 31 has a screw boss to which the bolt 33 is fastened, and the screw boss is positioned to the attachment hole 2 formed in the bottom part of the bathtub-shaped part 1. The capture 32 has a legged washer structure, for example, and is configured to be electrically conductive to the metal body with claws at the leading end of the leg biting into the bottom part of the bathtub-shaped part 1. The ground base may be a resin base. Also in this case, the fixed conductive part electrically conductive to the ground of the circuit board 20 may be used. Further, a simpler configuration may be employed in which the metal body is sandwiched by the circuit board 20 and the toothed washer followed by fixation using a bolt and a nut.

In the vehicle body-embedded antenna device according to the present invention, the plate-like antenna element 10 is disposed inside the bathtub-shaped part 1 at the highest possible level therein as described above, thus making it possible to suppress deterioration in the signal reception performance of the plate-like antenna element 10. Further, since the plate-like antenna element 10 is disposed inside the bathtub-shaped part 1, noise radiated from electric components inside the vehicle is shielded, eliminating the need to take countermeasures against noise.

Figure 3:
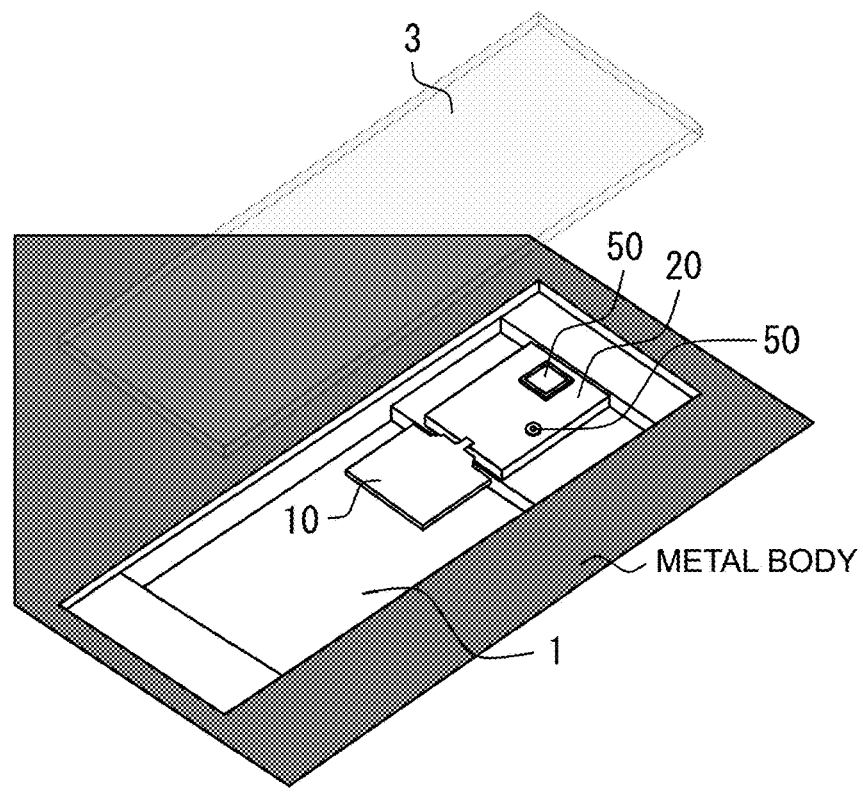
FIG. 3 is a schematic perspective view for explaining another example of the vehicle body-embedded antenna device according to another illustrated embodiment.
Figure 4:
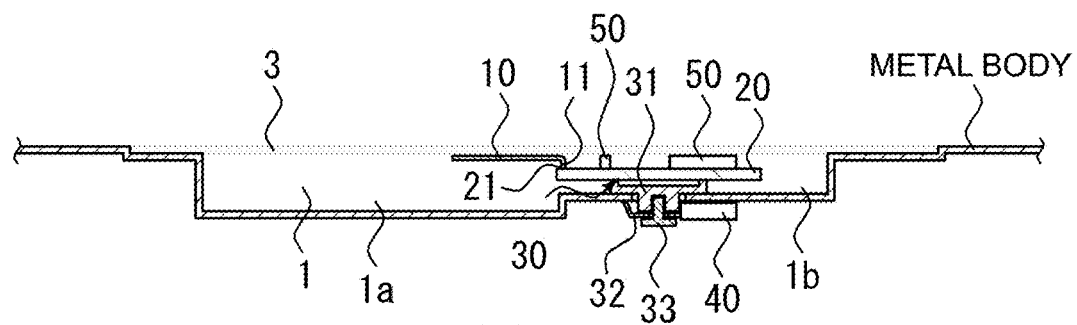
FIG. 4 is a schematic cross-sectional side view for explaining another example of the vehicle body-embedded antenna device according to another illustrated embodiment.

Another example of the vehicle body-embedded antenna device according to the present invention will be described using FIGS. 3 and 4. FIG. 3 is a schematic perspective view for explaining another example of the vehicle body-embedded antenna device according to the present invention. FIG. 4 is a schematic cross-sectional side view for explaining another example of the vehicle body-embedded antenna device according to the present invention. In the drawings, the same reference numerals as those in FIG. 1 denote the same parts. This example is the vehicle body embedded antenna device embedded in the bathtub-shaped part 1 having the bottom part which has two depth levels of a deep part 1a and a shallow part 1b. As illustrated, the bathtub-shaped part 1 is processed so as to have the deep part 1a having a deep bottom and the shallow part 1b having a shallow bottom. As in the case of the bathtub-shaped part 1 according to the above previous example, the bathtub-shaped part 1 having the two depth levels may also be obtained by recessing the vehicle metal body with respect to the metal body surface through metal press processing such as draw processing. The attachment hole 2 may be formed in the bottom of the shallow part 1b.

The plate-like antenna element 10 is positioned in the deep part 1a as viewed from above. In this example as well, the plate-like antenna element 10 is disposed inside the bathtub-shaped part 1 at the highest possible level therein so as to be substantially parallel to the metal body surface. That is, the plate-like antenna element 10 is separated from the bottom of the deep part 1a to be disposed inside the bathtub-shaped part 1 at the highest possible level therein. This can minimize deterioration in the signal reception performance of the plate-like antenna element 10.

On the other hand, the circuit board 20 may be disposed in the shallow part 1b as viewed from above. Since the circuit board 20 is preferably disposed close to the vehicle metal body serving as the ground thereof, it may be disposed in the shallow part 1b.

As described above, the bottom part of the bathtub-shaped part 1 has a two-step structure of the deep part 1a and the shallow part 1b and, accordingly, a space is generated at the back surface side (vehicle cabin side) of the shallow part 1b. Thus, in the illustrated vehicle body-embedded antenna device according to the present invention, a signal transmitting/receiving connector 40 is provided at the back surface side of the shallow part 1b of the bathtub-shaped part 1. By thus disposing the signal transmitting/receiving connector 40 at the back surface side of the shallow part 1b, it is possible to eliminate the need to protrude to the vehicle cabin side by the height of the signal transmitting/receiving connector 40 to thereby suppress an increase in the thickness of the entire structure including the bathtub-shaped part 1. The signal transmitting/receiving connector 40 may be of a so-called pig tail type.

Further, as illustrated, the capture 32 of the fixed conductive part 30 can also be provided at the back surface of the shallow part 1b. Thus, the fixed conductive part 30 does not protrude to the vehicle cabin side, either. In this respect, it is possible to suppress an increase in the thickness of the entire structure including the bathtub-shaped part 1.

In this example, an on-ground type antenna element 50 is disposed on the circuit board 20. The on-ground type antenna element 50 is an antenna element that can be placed on the ground of the circuit board or metal body. More specifically, examples of the on-ground type antenna element 50 include a patch antenna element for GNSS (Global Navigation Satellite System) applications or a satellite digital radio, an inverted F antenna element for Wi-Fi, a high-frequency-band monopole antenna element for V2X (Vehicle-to-Everything) applications, and the like. The on-ground type antenna element 50 like this may appropriately be disposed on the circuit board 20.

For example, when the on-ground type antenna element is disposed on the circuit board 20, it is preferably disposed inside the bathtub-shaped part 1 at the highest possible level therein. This is because when a patch antenna element is used as the on-ground type antenna element, reception performance is affected due to the presence of a metal body inside the directionality thereof. Specifically, when a metal body is present inside an angle of 30° from the horizontal surface of the patch antenna element, reception performance may be affected. The metal body mentioned here includes the side wall of the bathtub-shaped part 1 and the plate-like antenna element 10. That is, when the patch antenna element is disposed at a low position, there is a possibility that the side wall of the bathtub-shaped part 1 or plate-like antenna element 10 is located inside the directionality. Therefore, the on-ground type antenna element 50 may be disposed inside the bathtub-shaped part 1 at the highest possible level within a range where these metal bodies are not located inside the directionality:

The height of the side wall of the bathtub-shaped part 1 may differ in the traveling direction of the vehicle. For example, when the bathtub-shaped part 1 is disposed at the roof rear side of the vehicle, the side wall at the rear side in the traveling direction is generally lower in height than the side wall at the front side in the traveling direction. In this case, a V2X antenna element, for example, disposed on the circuit board 20 exhibits good reception performance by being disposed at the side having less influence of the side wall, i.e., the side having a lower side wall.

Figure 5:
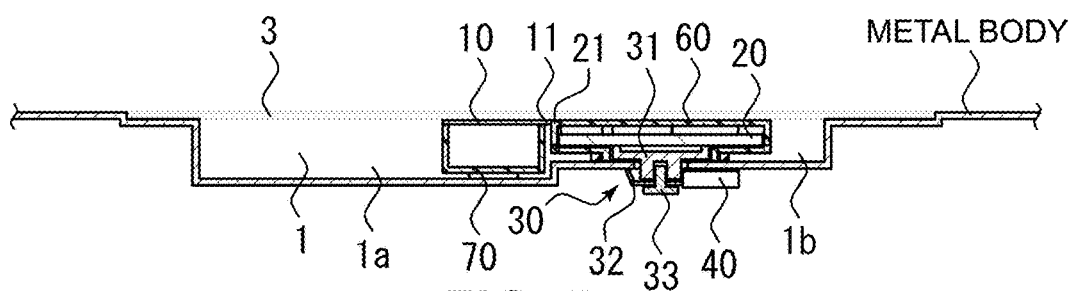
FIG. 5 is a schematic cross-sectional side view for explaining still another example of the vehicle body-embedded antenna device according to another illustrated embodiment.

Still another example of the vehicle body-embedded antenna device according to the present invention will be described using FIG. 5. FIG. 5 is a schematic cross-sectional side view for explaining still another example of the vehicle body-embedded antenna device according to the present invention. In the drawings, the same reference numerals as those in FIG. 4 denote the same parts. In this example as well, the bottom part of the bathtub-shaped part 1 has two depth levels of the deep part 1a and the shallow part 1b. The vehicle body-embedded antenna device of this example is embedded in the bathtub-shaped part 1 and then covered with the cover 3 such as a blindfold cover or a glass cover. In this case, although no problem occurs when completely water/dustproof is achieved, there is a possibility that water intrudes into a gap between the cover 3 and the metal body.

Thus, in the example illustrated in FIG. 5, a waterproof case 60 is provided. Since there is no problem when the plate-like antenna element 10 itself is in an exposed state, only the circuit board 20 is covered with the waterproof case 60. The circuit board 20 includes an amplifier circuit and the like, so that it is preferably subjected to waterproof treatment. The waterproof case 60 may be configured to cover the entire circuit board 20. Further, when the ground base 31 is used for the fixed conductive part 30, the entire circuit board 20 including the ground base 31 may be covered. Then, a hole is formed at a position corresponding to the screw boss to which the bolt 33 of the waterproof case 60 is fixed, and the surrounding portion thereof may be subjected to water/dustproof treatment using a gasket or the like according to the needs.

As illustrated, in this example, the plate-like antenna element 10 is not covered with the waterproof case 60. If the plate-like antenna element 10 is covered with the waterproof case 60, it is brought close to the bottom part of the bathtub-shaped part 1 by the upper surface side thickness of the waterproof case 60. Thus, the plate-like antenna element 10, which has no problem when being in an exposed state, is not covered with the waterproof case 60 and is disposed inside the bathtub-shaped part 1 at the highest possible level therein. When the bathtub-shaped part 1 has a sufficient depth, the plate-like antenna element 10 may appropriately be covered with the waterproof case 60.

Further, the feeding part 21 connected with the plate-like antenna element 10 may appropriately be insert-molded in the waterproof case 60. When the feeding part 21 is thus configured to be exposed outside the waterproof case 60, it is possible to connect the feeder 11 of the plate-like antenna element 10 to the circuit board 20 while maintaining waterproof performance.

In order for the plate-like antenna element 10 to be fixed inside the bathtub-shaped part 1 at the highest possible level therein, a base part may appropriately be provided. In the example of FIG. 5, as the base part, an insulating base part 70 that supports the lower surface of the plate-like antenna element 10 from the bottom part of the bathtub-shaped part 1 is used. The insulating base part 70 supports the plate-like antenna element 10 from the lower side and does not have influence on the upper surface of the plate-like antenna element 10. That is, even when the insulating base part 70 is used, the plate-like antenna element 10 can be disposed inside the bathtub-shaped part 1 at the highest possible level therein.

The waterproof case 60 and insulating base part 70 can be both made of resin or the like, so that they may be formed integrally with each other. Specifically, the lower surface side of the waterproof case 60 and the insulating base part 70 are formed in one piece, and the upper surface side of the waterproof case 60 formed separately is used to cover the circuit board 20.

As described above, the illustrated vehicle body-embedded antenna device according to the present invention can be constructed so as to be separated into a waterproof area on the circuit board 20 side and a non-waterproof area on the plate-like antenna element 10 side.

The back surface side of the insulating base part 70 may generate noise due to vibration caused by direct contact with the bathtub-shaped part 1. To cope with this, a cushion material may appropriately be interposed between the back surface side of the insulating base part 70 and the bathtub-shaped part 1.

The vehicle body-embedded antenna device according to the present invention is not limited to the above illustrated examples but may be variously modified without departing from the scope of the present invention.

The invention claimed is:

1. A vehicle body-embedded antenna device that is embedded in a bathtub-shaped part which is formed by recessing a vehicle metal body with respect to a surface thereof and has an attachment hole in a bottom part thereof, the vehicle body-embedded antenna device comprising:
    a plate-like antenna element having a planar plate part disposed inside the bathtub-shaped part at a highest possible level therein so as to be substantially parallel to the metal body surface;
    a circuit board disposed inside the bathtub-shaped part so as not to overlap the plate-like antenna element as viewed from above and having a feeding part connected with the plate-like antenna element; and
    a fixed conductive part electrically conductive to both the circuit board and bathtub-shaped part and fixed to the bottom part of the bathtub-shaped part through the attachment hole formed in the bottom part of the bathtub-shaped part.

2. The vehicle body-embedded antenna device according to claim 1, wherein
    the bottom part of the bathtub-shaped part has two depth levels of a deep part and a shallow part, and the plate-like antenna element is positioned in the deep part as viewed from above, and the circuit board is positioned in the shallow part as viewed from above.

3. The vehicle body-embedded antenna device according to claim 2, further comprises
a signal transmitting/receiving connector which is disposed on the back surface side of the shallow part of the bathtub-shaped part.

4. The vehicle body-embedded antenna device according to claim 1, wherein
the fixed conductive part includes a ground base disposed just below the circuit board and electrically conductive to a ground of the circuit board and a capture fixed to the ground base through the attachment hole formed in the bottom part of the bathtub-shaped part and electrically conductive to the bathtub-shaped part.

5. The vehicle body-embedded antenna device according to claim 1, further comprises
an on-ground type antenna element disposed on the circuit board.

6. The vehicle body-embedded antenna device according to claim 5, wherein
the on-ground type antenna element is disposed inside the bathtub-shaped part at the highest possible level therein.

7. The vehicle body-embedded antenna device according to claim 1, further comprises
a waterproof case, wherein
the circuit board is covered with the waterproof case.

8. The vehicle body-embedded antenna device according to claim 1, further comprises
an insulating base part that supports a lower surface of the plate-like antenna element from the bottom part of the bathtub-shaped part.

* * * * *